United States Patent [19]

Cavagna

[11] Patent Number: 4,836,458

[45] Date of Patent: Jun. 6, 1989

[54] DEVICE FOR THE SELECTIVE OR SIMULTANEOUS TRAVERSE OF THE CUTTING MEMBERS IN A MACHINE FOR THE CHOPPING AND/OR CUTTING OF MATERIAL IN SHEET

[76] Inventor: Elio Cavagna, P.zza Piemonte, 5, 20070 Melegnano (Milano), Italy

[21] Appl. No.: 119,845

[22] Filed: Nov. 12, 1987

[30] Foreign Application Priority Data

Apr. 8, 1987 [IT] Italy .............................. 20028 A/87

[51] Int. Cl.⁴ ...................... B02C 18/18; B02C 18/24; B23D 19/06

[52] U.S. Cl. ................................ 241/101.2; 83/425.4; 83/499; 83/508.3; 241/230; 241/234; 241/286

[58] Field of Search .................... 241/101.2, 230, 234, 241/239, 286; 83/499, 502, 508.3, 425.4

[56] References Cited

U.S. PATENT DOCUMENTS 4,077,291 3/1978 Obenshain ............................ 83/499

*Primary Examiner*—Joseph M. Gorski

*Attorney, Agent, or Firm*—Bucknam and Archer

[57] ABSTRACT

Device for the selective or simultaneous traverse of the cutting members in a machine for the chopping and/or cutting of material in sheet, supported by supporting and slip beams, comprising:

two bar-formed elements, mechanically interconnected, each parallel to the respective supporting and slip beams;

a motor which drives the rotation of at least one of said elements;

means of transformation of the rotating movement of the bar-shaped elements in rectilinear traverse movement of each cutting member; and means of energization and de-energization of said means of transformation.

5 Claims, 2 Drawing Sheets

DEVICE FOR THE SELECTIVE OR SIMULTANEOUS TRAVERSE OF THE CUTTING MEMBERS IN A MACHINE FOR THE CHOPPING AND/OR CUTTING OF MATERIAL IN SHEET

BACKGROUND OF THE INVENTION

1. Field of the Invention

The present invention refers to a device for the selective or simultaneous traverse of the cutting members in a machine for the chopping and/or cuttng of material in sheet. More in particular, the present invention concerns a device for the selective or simultaneous traverse of the position of circular knives and counterknives on the beams of a machine for chopping and/or cutting of material in paper sheet.

2. Description of the Prior Art

The need is noted, in the copper technique, to vary the position of the operating members, generally knives and counterknives, on respective beams in machines for the abovementioned objects in relation to the required cutting and/or chopping sizes of the material submitted to this operation. It is also known that at present this positioning is made in different ways, one of them the motorization of each of the operative cutting members until same can traverse on the respective beam. This method of varying the position of the cutting members presents various problems of a constructive and economic nature. In fact, the structure of said members is rather complicated and the total cost of each operative member is high. Moveover, there is the problem of installing the supply cables of each motor, which may prevent good operation of the machine.

Another noted method of positioning the operative cutting members consists in connecting same to devices cooperating with feed screws, whose rotations determine the traverse of the operative members.

Also this method is not without drawbacks, due to the fact that the structure is very complex; as each feed screw cooperates with clutches comprised in the respective devices, the cooperation between screw and clutches is not always reliable, and the various positionings of said operative members are controlled by numerous electronic and/or electric components in various positions, which further complicate the already complex structure of the machine.

The object of the present invention is to provide a device for the selective or simultaneous traverse of the position of knives and counterknives in a machine for the chopping and/or cutting of material in sheet, which does not present the abovementioned drawbacks and limitations.

SUMMARY OF THE INVENTION

According to the present invention, all the above problems are solved by means of a device for the selective or simultaneous traverse of the cutting members, supported on supporting and slip beams, in a machine for the chopping and/or cutting of material in sheet, comprising:

two substantially bar-shaped elements, each parallel to the respective supporting and slip beams of the cutting members, said bar-formed elements being mechanically interconnected;

a motor which drives the rotation of at least one of said bar-shaped elements;

means of transformation of the rotating movement of the bar-shaped elements in rectilinear traverse movement of each long member;

means of energization and/or de-energization of said means of transformation.

In particular, the traverse device of the cutting members of the present invention comprises;

two parallel shafts, mechanically interconnected and moved synchronically in rotation round their respective axes by a single motor, a series of means of connection, e.g. cogged wheels, corresponding to the number of cutting members, keyed and torsionally fixed on each shaft, a small shaft inserted in a substantially cylindrical structure fixed to each cutting member, said small shaft being equipped at one end with a pinion engaged with a rack obtained on the supporting and slip beam of the cutting members, and two bushes inserted on said small shaft, one of them free to rotate round said small shaft and equipped with a toothed rim engaged at a right angle with one of the cogged wheels keyed on the shaft, and other bush torsionally fixed to the same small shaft, the latter bush fixed being axially mobile with respect to the first and moving determining a torsional tie or clearance between the two bushes and therefore the rotation or non-rotation of the small shaft and pinion.

The axially mobile bush presents the upper part with larger diameter, contained in a chamber, and the axial movement is determined by the contrasting, opposing action of an adjustable compression and pressure spring of a fluid poured into said chamber.

BRIEF DESCRIPTION OF THE DRAWINGS

The constructive and functional characteristics of the present device for the selective or simultaneous traverse of the cutting members will be more easily understood from the following detailed description, in which reference is made to the enclosed drawings which show a preferred, illustrative but not limitative form of realization of the present invention, and in which.

DESCRIPTION OF THE PREFERRED EMBODIMENT

Figure 1:
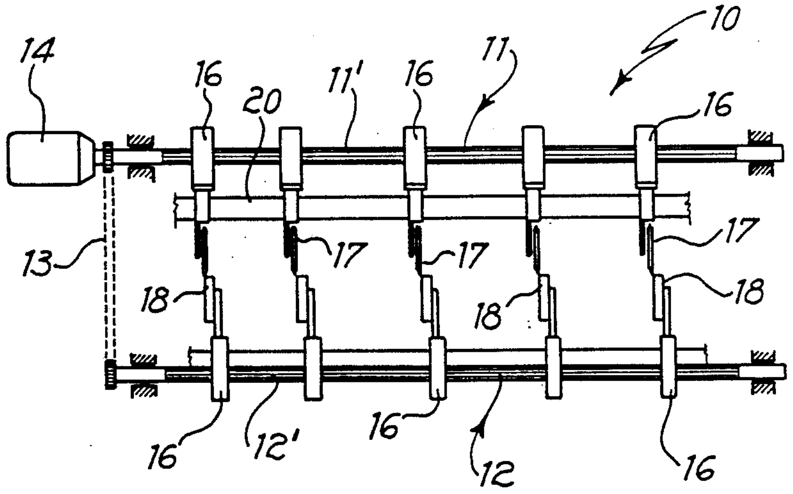
FIG. 1 shows a front schematic view of a machine for the chopping and/or cutting of material in sheet, equipped with traverse devices of the cutting members, according to the present invention.
Figure 2:
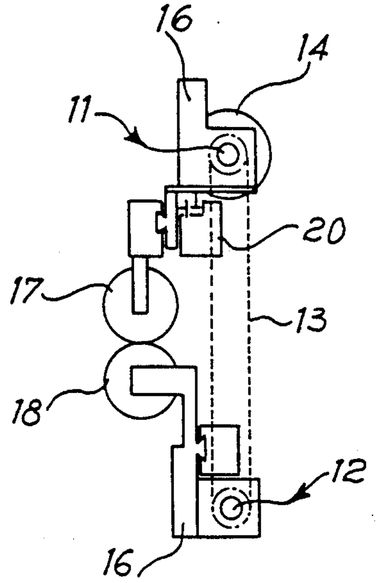
FIG. 2 shows a lateral schematic view of a traverse device of the cutting members of the present invention.

With reference to the figures, the machine 10 for the chopping and/or cutting of material in sheet, comprises a plurality of cutting members, each composed of a knife or blade 17 and a counterknife or counterblade 18, supported by beams 20, on which they can traverse.

The traverse device of the cutting members, object of the present invention, comprises two substantially bar-formed elements, composed of shafts 11 and 12, which are mechanically interconnected, for example with a chain 13, and driven by a motor 14 which sets them in synchronic rotation around the respective axes. Said shafts 11 and 12, supported in rotable manner to the opposite ends of the machine casing, are equipped with longitudinal grooves 11' and 12' to fix, only torsionally, a plurality of cogged wheels 15 (see FIGS. 3 and 4), each of which is engaged, as specified later, in a device 16.

To each of these devices 16, positioned on shaft 11, is fixed, in any known way, a knife 17, in this case circular, while to each of the devices 16, positioned on shaft 12, is fixed a counterknife 18, also circular.

In the continuation of the present invention and with particular reference to FIGS. 3 and 4, a description will be given of only one of these devices 16 and more specifically one of those to which the knife 17 is fixed, the others, including those to which the counterknives 18 are fixed, being functionally and structurally similar.

Figure 3:
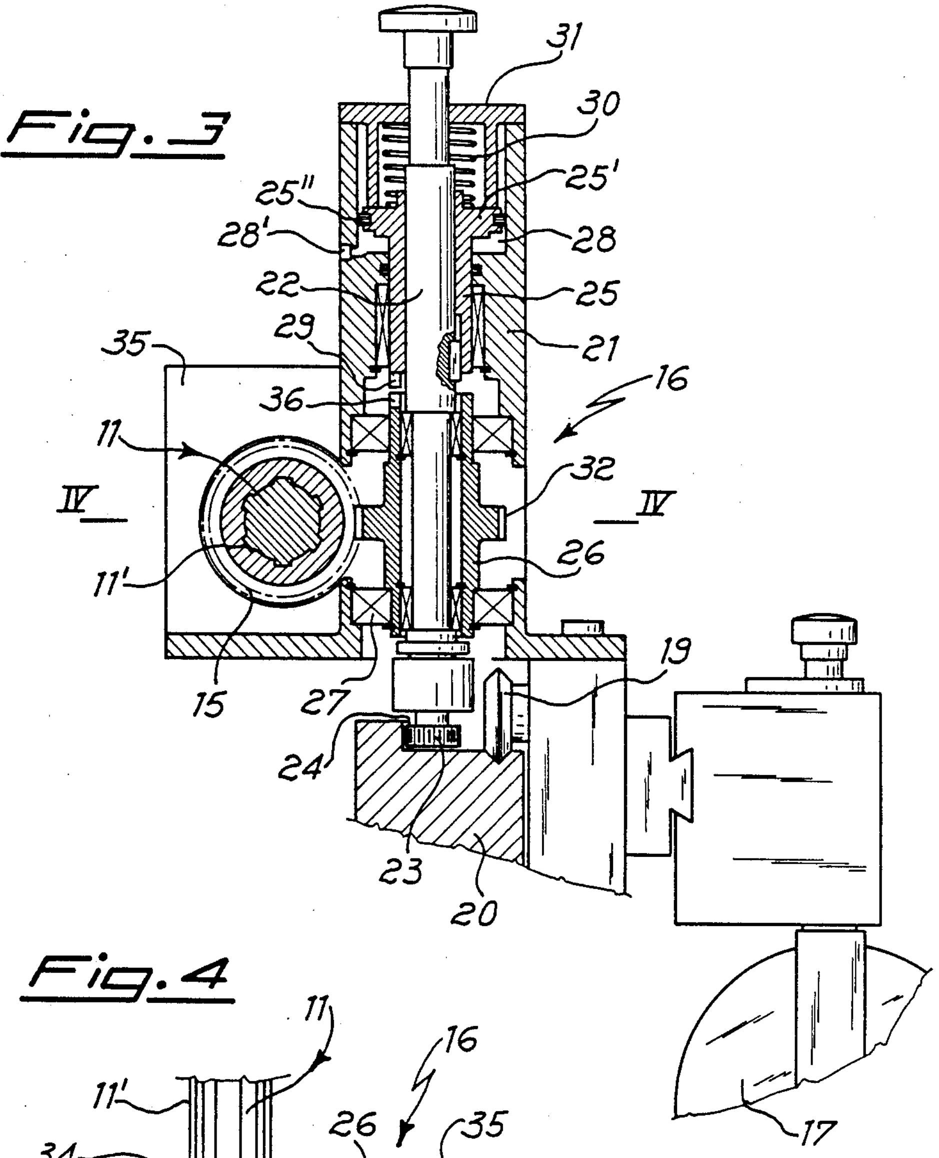
FIG. 3 shows the schematic view of the section of the section of the traverse device in FIG. 2
Figure 4:
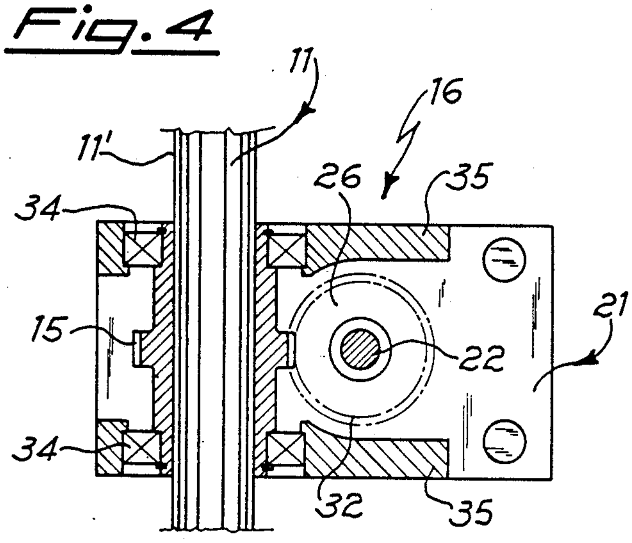
FIG. 4 shows the schematic view of the section of the device in FIG. 3, made with a through-plane along line IV—IV.

With reference to the abovementioned FIGS. 3 and 4, the device 16 and knife 17 are slip supported, by a sliding means like rollers 19, by a supporting and slip beam 20.

This device 16 comprises a substantially cylindrical vertical structure 21, of compact size, in which a small shaft 22 is inserted, partly projecting from said structure. The lower part of said small shaft 22 is equipped with a pinion 23 which is engaged in a rack 24 with which the beam 20 is equipped.

Along the axis of the small shaft 22 are inserted two bushes 25 and 26, one an extension of the other. Of said bushes, the upper one 25 is torsionally fixed to said small shaft 22 and axially mobile with respect to the lower bush 26. Said lower bush 26 is axially stationary and free to rotate on bearings 27 around the axis of the small shaft 22.

The bush 25 is so shaped that it terminates at the upper end with a portion 25' of larger diameter, seal sliding into a chamber 28, equipped with an opening 28', obtained in the vertical structure 21. At the lower end, said bush 25 is equipped with a projection or "tooth" 29. On this portion 25' of larger diameter is located a spring 30, which, in contrast with a "plug" 31 closing chamber 28, keeps said portion 25' in contact with the back wall of the chamber 28.

Passing to the axially stationary lower bush 26, this is shaped to form a toothed rim 32, constantly engaged at right angle in the cogged wheel 15, keyed on the shaft 11 and supported, by interposition of bearings 34, by shoulders 35 of the vertical cylindrical structure 21 of the device 16. The bush 26 is also equipped, in the upper part, corresponding to the bush 26, with a seat 36, to be engaged with the tooth 29 of the bush 25. When seat 36 is engaged with tooth 29, the small shaft 22 and bushes 25 and 26 are torsionally fixed and therefore the rotation of the small shaft 11 and cogged wheel 15 impose a rotation of the toothed rim 32 and and then, for the abovementioned torsional tie, to pinion 23. The latter, being engaged in rack 24, causes a traverse of the device 16, along the beam 20, obtaining a new position of same.

If, for sheet cutting reasons, any one or more of the knives 17 must not be repositioned, a flow of fluid, e.g. pressurized air, is inserted in chamber 28, through opening 28', which, winning the reaction of the spring 30, thrusts the portion 25' axially upwards, operating like a piston with perimetral seal gasket 25", of the bush 25, freeing tooth 29 from seat 36 of bush 26 (as shown in FIG. 3). Bush 26 can thus freely rotate around the small shaft 22 which therefore, in this case, remains stationary, and device 16 cannot therefore traverse along beam 20.

Obviously the description of the devices to which knives 17 are connected also applies for the devices to which the counterknives 18 are associated, which, as already mentioned, are functionally and structurally similar.

The structures of the supports of knives 17 and counterknives 18 are not described in detail being of known type. The traverse device of the present invention has been described and illustrated above solely by way of example but is not binding; modifications and variants may therefore be made to same, e.g. the connection between devices 16 and shafts 11 and 12 could be made in a different way, without leaving the scope of the present patent application.

I claim:

1. A machine for chopping and/or cutting of material in sheet form, which comprises cutting members, slip beams, each slip beam supporting respectively each of said cutting members, each beam being equipped with a rack, a device for the selective or simultaneous traverse of the position of the cutting members along said beams which comprises two substantially bar-formed elements, each parallel to said slip beams, said bar-formed elements being mechanically interconnected;
   - a motor connected to at least one of said bar-formed elements for actuation of said bar-formed elements in rotational movement;
   - means for transforming the rotational movement of said bar-formed elements to rectilinear traverse movement of each cutting member along one of said slip beams; and
   - means for energizing and de-energizing said means for transforming and wherein, the means for transforming the rotational movement of the bar-formed elements to rectilinear traverse movement of each member comprise;
   - a series of connecting means, corresponding to the number of cutting members, keyed and torsionally fixed on each bar-formed element;
   - a substantially cylindrical vertical structure fixed to each cutting member, in which a small shaft is inserted, equipped at one end with a pinion engaged with one of said racks, said shaft having an axis;
   - two bushes inserted in said vertical structure along said axis of small shaft, a first of which being axially stationary relative to said small shaft and being free to rotate around said small shaft and equipped with means engaged at a right angle with one of said connecting means, and the second of which being torsionally fixed relative to said small shaft and being axially mobile with respect to the first bush, the second bush moving axially and determining a torsional tie with the first bush or determining a clearance between the pair of bushes.

2. The device according to claim 1 wherein said bush that is axially mobile has at least one projection at one end thereof, the torsional tie between said bushes consists of said at least one projection projecting into a seat present at an adjacent end of the other bush.

3. The device according to claim 2 wherein said cylindrical vertical structure has a chamber, the axially mobile bush is equipped at the end opposite that of said projection with a portion of larger diameter seal sliding into said chamber, having the function of a piston; on said portion of larger diameter is placed a spring which holds in torsional tie position the second bush with the axially stationary bush; said chamber being equipped, below the portion of larger diameter of said axially mobile bush with an opening through which can be inserted a flow of a fluid under pressure, which, axially moves the second bush, freeing it from the torsional tie with the axially stationary bush.

4. The device according to claim 1 wherein the two substantially bar-shaped elements are composed of shafts of substantially circular section, each of which presents longitudianl grooves to tie only torsionally said connection means.

5. A device according to claim 1 wherein said cylindrical vertical structure has shoulders, the axially stationary bush rotates on bearings around the axis of said small shaft and is supported, by interposition of the bearings, by said shoulders of said vertical structure.

* * * * *